April 21, 1931.  N. L. GULLIFORD  1,801,738
ROTARY CUTTER
Filed Feb. 5, 1927
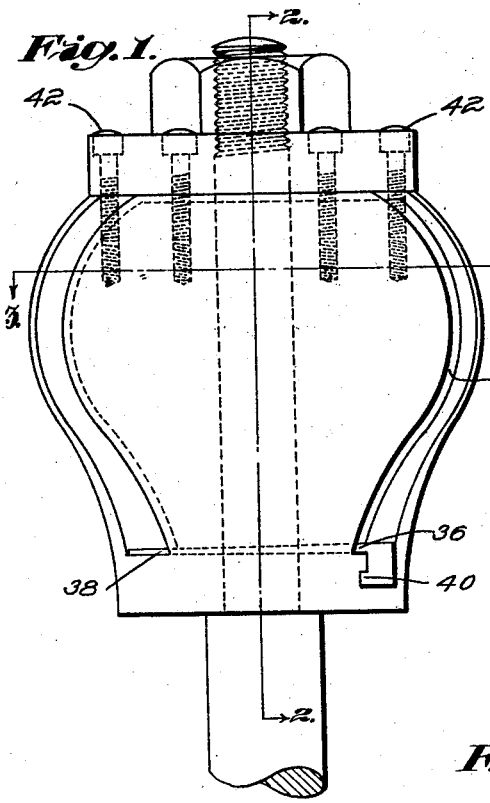
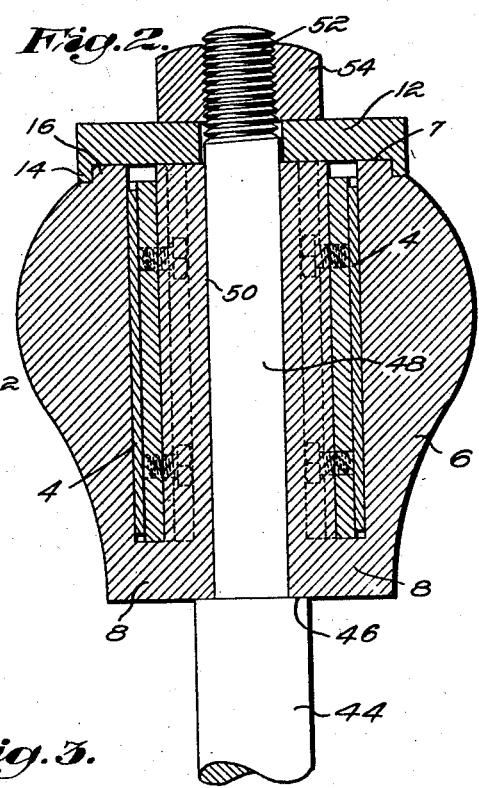
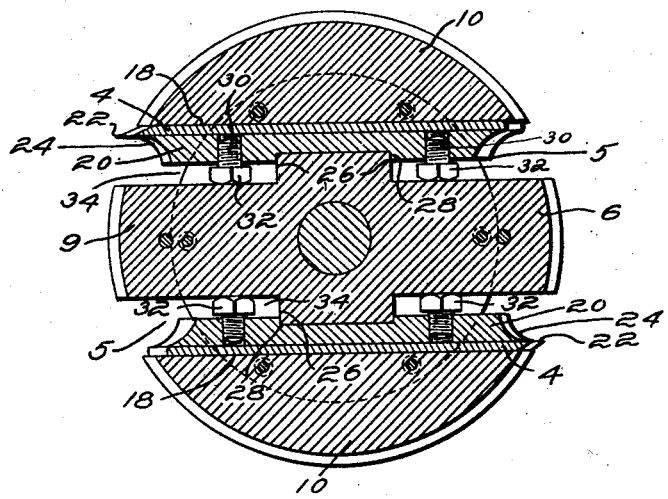
Inventor;
Nicholas L. Gulliford
by Emery Booth Janney & Varney
Attys.

Patented Apr. 21, 1931

1,801,738

UNITED STATES PATENT OFFICE

NICHOLAS L. GULLIFORD, OF PEABODY, MASSACHUSETTS; ARCHIBALD T. GULLIFORD ADMINISTRATOR OF SAID NICHOLAS L. GULLIFORD, DECEASED

ROTARY CUTTER

Application filed February 5, 1927. Serial No. 166,128.

This invention aims to provide an efficient, durable and relatively safe rotary cutter for woodworking machinery, and in the accompanying drawings I have shown merely for illustrative purposes one embodiment of the invention, wherein Fig. 1 is a side elevation of the cutter;

Fig. 2 is a longitudinal section taken approximately along the line of the axis of the cutter; and Fig. 3 is a transverse section taken on the line 3—3 of Fig. 1.

In the drawings I have shown the invention in the form of a rotary cutter such as may be used in turning wood heels and similar articles but more particularly the sides and rear surfaces of said heels. These cutting edges describe approximately reverse or S-shaped curves whereby when a heel block is moved into operative engagement with the cutter in the usual manner, that is by revolving the block from its rear center position first around one side and then around the other, the sides and rear portions of the heel block will be accurately turned to the desired shape. The invention however is not limited to cutters for turning heels nor to the particular parts of the heels herein mentioned.

The cutter blades 4, only two of which are shown, herein are placed upon opposite sides of the axis of the cutter and in recesses 5 arranged tangential to a circle struck from the axis of the cutter, and formed in the body of a cutter holder 6.

The recesses 5 desirably extend from one face to the other of said holder and from one end, herein the upper end, 7 longitudinally of said holder for the greater portion of its length. In the present example only a small body 8 of the metal constituting said holder remains to unite the central part 9 of said holder with the outer or wing portions 10 thereof.

Where the recesses 5 open to one end of the holder, as described, it is desirable to reinforce that end of the holder in order to prevent spreading under centrifugal action of the wing portions 10 of the holder when the cutter is rotating at the high rate of speed common to such cutters. To this end I provide a plate 12 which interlocks with the parts 9 and 10 of said holder, herein by means including an annular rim or flange 14 formed on the plate 12 and overlying a complementary portion 16 formed on the adjacent end of the holder 6. It is to be understood however that the invention is not limited to the particular form of reinforcing means shown.

The cutter blades 4 are arranged within the recesses 5, preferably against the inner surfaces 18 of the wing portions 10, and are clamped against said surfaces by clamping plates 20 approximately the same in outline as said cutter blades.

One edge at least of each of the cutter blades 4 is shaped or curved as previously stated to conform with the curvature desired for the finished heel or other article to be shaped thereby, this edge being best shown at 22 in Fig. 1 as a reverse or S-shaped curve. The cutting edge 22 projects only slightly beyond the periphery of the body of the holder 6, which periphery is shaped substantially to conform with the curvature of said cutting edge 22. In other words, the shape of the holder body substantially corresponds with the form described by the rotary cutter blades, so that when the cutter is rotating the space between the cutting edges of the blades will be substantially filled by the body of the cutter holder. This prevents accidental insertion of the operator's hand and provides a safe cutter which would be incapable, at least during an instantaneous insertion of a hand or finger, of completely severing such member because there is only a slight projecting of the cutter's edge beyond the face of the holder. Obviously the only damage that would be done to the member thus accidentally brought into contact with the cutter would be the shaving off of a portion of the skin or flesh. Without the protecting body of metal between the blades the entire hand or the fingers thereof would be cut off before the operator had time to remove them.

The clamping plate 20 has at least one edge shaped substantially to conform in outline with the cutting edge 22 of the cutter blade. This edge is desirably chamfered at 24 to serve as a chip breaker for the material removed by the cutter blade from the block. The clamping plate is considerably thicker than the cutter blade and is held against movement within the recess 5 radially of the holder, herein by means including a tongue and groove, one of which, desirably the tongue 26, is formed upon the central part 9 of the holder 6, the groove 28 being formed in the adjacent face of the clamping plate. It is however to be understood that the invention is not limited to this specific means for preventing radial movement of said clamping plate.

The cooperating tongue 26 and groove 28, while preventing movement of the clamping plate radially with respect to the cutter holder or transversely thereto, will allow said plate to slide axially of the cutter holder when it is desired to remove said clamping plate from the open end of the recess 5 or to insert the plate therein in assembling the cutter.

Pressure is applied to each clamping plate 20, in the present example by screws 30 having screw-threaded engagement with said plate and provided with heads 32. The heads 32 occupy spaces 34 between the clamping plate and the adjacent surface of the inner or central portion 9 of the holder, against which said heads are brought into contact to exert pressure through the clamping plates against the cutter blades 4. The heads of the screws 30 are accessible through the open sides of the recesses 5 for turning by a suitable instrument either out of or into the plate. The turning out of the screws into engagement with the part 9 applies pressure to set the cutter blade and the turning of the screw into the plate effects the release of the same when removal or adjustment is desired.

The length of the threaded portion of each screw 30 is approximately equal to or slightly less than the thickness of its plate so as not to project through said plate when the screw is turned in, thus leaving the cutter blade free to be removed from the recesses 5.

The cutter blades 4 are slightly shorter than the recesses 5, measured longitudinally of the axis of the cutter, in order to permit the cutter blade to be tipped at different angles relatively to said axis.

An accurate and uniform setting of the cutter blades within the holder may be effected by means of a wedge-shaped gauge 36, the body 38 of which has a taper corresponding to the angle of tilt desired for the cutter. A head portion 40 on said wedge engages the outer face or periphery of the holder and limits the insertion of the wedge in the recess so that by employing the same gauge first in the bottom of one recess and then in the other an accurate and uniform placing of the cutter blades within their respective recesses will be assured. After each cutting blade has been properly placed as aforesaid and its cutting edge positioned at the proper distance from the axis of the cutter, the clamping screws 30 for that plate are set up to clamp the blade in place. The gauge 36 may then be removed and the same operation performed upon the other cutter blade.

It is obvious that the angles of the wedge portions of the gauges 36 will vary according to the angle of inclination desired for the particular cutter that is to be used, therefore a different gauge may be provided for each angular position required. The invention however is not limited to this method of adjusting the angle of the blades.

The plate 12 is shown attached to the holder 6 by screws 42 extending through said plate and into engagement with the portions 9 and 10 of the cutter holder. If desired however the screws 42 may be dispensed with and the plate 12 be secured in its position upon the holder by the means for securing the cutter to the arbor 44 upon which the cutter is mounted.

The arbor 44 is reduced in diameter at 46 forming a shoulder 48 against which the holder 6 seats. The reduced portion 46 of the arbor extends through the central bore 50 of said holder and has screw-threaded engagement at its protruding end 52 with a nut 54 which when screwed down against the plate 12 securely clamps the cutter against rotation upon its arbor.

In addition to preventing the spreading of the wings 1, due to centrifugal action of the parts of the rotating cutter, the plate 12 counteracts the spreading tendency of said wings caused by the clamping screws 30 which seat against the part 9 of the holder.

Although the cutter embodying this invention has been described as a cutter for wood-working machines, it is obvious and to be understood that the invention is not limited to this specific application.

Claims:

1. A rotary cutter comprising, in combination, cutter blades, a cutter blade holder having circumferentially spaced recesses to receive said blades, said recesses extending longitudinally of said holder for less than its full length and open at one end, means to position said blades within their respective recesses in predetermined uniform angular relation to the axis of said holder, and a plate for the open end of said holder to prevent spreading of the holder parts.

2. A rotary cutter comprising, in combination, cutter blades, a holder for said blades having recesses to receive said blades, said recesses extending longitudinally of said holder and open to one face only thereof, clamping means arranged in said recesses to clamp each cutter blade against one side of its respective recess, and means arranged adjacent the open ends of said recesses to prevent spreading of the parts of said holder under pressure exerted by said clamping means.

3. A rotary cutter comprising a body having at least one recess extending transversely from face to face of said body and longitudinally from one end nearly to the other end thereof, a cutter blade arranged in said recess with its cutting edge projecting slightly beyond the periphery of said body, a clamping member for said cutting blade, clamping screws between one wall of said recess and said clamping member for forcing said member and said cutting blade against the other wall of said recess, and means arranged across the open end of said recess to prevent the spreading of the sides of said body by the cutter blade clamping means.

4. A rotary cutter comprising a body having transverse recesses extending from face to face of said body and longitudinally from one end nearly to the other end thereof, a cutter blade arranged in each recess with its cutting edge projecting slightly beyond the periphery of said body, a clamping member for said cutting blade, clamping means between one wall of each recess and the clamping member therein for forcing said member and said cutting blade against the other wall of said recess, and a cap having a flange encircling said body at the open end of said recess to prevent the spreading of the sides of said body by the cutter blade clamping means.

In testimony whereof, I have signed my name to this specification.

NICHOLAS L. GULLIFORD.